United States Patent [19]

Cromwell et al.

[11] 4,307,890
[45] Dec. 29, 1981

[54] PISTON RING WITH CHROME-FILLED GROOVE

[76] Inventors: John E. Cromwell, 911 W. 38th St., Baltimore, Md. 21211; Nicholas Herbert, 630 Longview Dr., Baltimore, Md. 21228; Glenn F. Hyde, 203 Medbury Rd., Timonium, Md. 21093

[21] Appl. No.: 739,129

[22] Filed: Nov. 5, 1976

Related U.S. Application Data

[63] Continuation-in-part of Ser. No. 612,821, Sep. 12, 1975, abandoned, which is a continuation-in-part of Ser. No. 480,164, Jun. 19, 1974, abandoned.

[51] Int. Cl.³ .............................................. F16J 15/00
[52] U.S. Cl. ............................... 277/224; 277/235 A
[58] Field of Search .................. 277/224, 216, 235 A; 29/156.6, 156.63

[56] References Cited

U.S. PATENT DOCUMENTS 2,565,042  8/1951  Phillips ........................... 277/235 A
3,435,502  4/1969  Thompson et al. ............ 277/235 A Primary Examiner—Robert I. Smith

[57] ABSTRACT

A piston ring having an annular groove in its outer periphery forming axially-spaced outer shoulders at each side of the ring, such groove including a bottom land and a pair of axially-spaced, radially intermediate lands connected to the bottom land and the outer bearing faces by radially outwardly diverging side walls forming stepped sides for the groove with the groove being filled with a layer of electro-deposited chromium. The deposited chromium and the bearing faces form a continuous axially convex surface on the face of the seal ring.

6 Claims, 4 Drawing Figures

PISTON RING WITH CHROME-FILLED GROOVE

CROSS-REFERENCES TO RELATED APPLICATIONS

This application is a continuation-in-part of co-pending application Ser. No. 612,821 filed Sept. 12, 1975, and now abandoned, by John E. Cromwell et al. and assigned to the assignee of the present invention. Ser. No. 612,821 is a continuation-in-part of application Ser. No. 480,164 filed June 19, 1974, now abandoned.

BACKGROUND OF THE INVENTION

1. Field of Invention

This invention relates to sealing rings having a coating of wear resistant material deposited on the bearing face thereof and more particularly to a piston ring having a chrome-filled stepped groove in its outer bearing face.

2. Description of the Prior Art

Chromium plated piston rings are old and well known in the art. However, the use of such rings has not been without problems. A major problem is the tendency of the chromium layer to crack from fatigue and cause the ring body to break in fatigue. Various approaches have been taken to eliminate this problem. Generally to prevent the breakage the industry has gone to higher strength base materials. Even in view of the added cost, the substitution has not been entirely successful.

Such rings have been successful in conventional diesel engines. However, the operating conditions imposed by the new high speed and high powered diesel engines have been such as to still cause ring failure, even within the warranty period. In one of these engines, the stresses included on the compression rings caused such a high rate of fatigue failures that continued production of the engine was questionable.

Accordingly, it is an object of the present invention to provide a chromium plated piston ring which is not subject to failure by reason of the fatigue of the ring and, therefore, is able to withstand the stresses imposed on compression rings by high speed and high powered diesel engines.

SUMMARY OF THE INVENTION

The foregoing and other objects and advantages have generally been achieved in the piston ring of the present invention which includes an annular groove in its outer periphery forming axially-spaced outer bearing faces between the groove and the side faces of the ring with the groove including a bottom land and a pair of axially-spaced radially intermediate lands connected to the bottom land and the outer bearing faces by radially outwardly diverging side walls forming stepped sides for the groove with the groove being filled with a layer of electro-deposited chromium. The chromium deposit and the outer bearing faces between the groove and the side faces form a continuous axially convex surface on the ring. In addition, the chromium is preferably of the stress cracked type to improve fatigue resistance of the chromium in the groove.

The above and further objects and novel features of the invention will appear more fully from the following detailed description when read in connection with the accompanying drawings.

BRIEF DESCRIPTION OF THE DRAWINGS

In the drawings wherein like parts are marked alike.

DESCRIPTION OF THE PREFERRED EMBODIMENT

Figure 1:
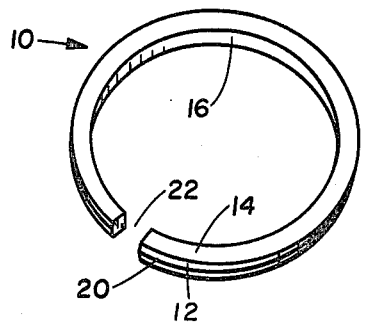
FIG. 1 is a perspective view of a piston ring of the present invention.

The piston ring of the present invention is generally denoted by numeral 10 in FIG. 1. A groove is formed in the outer periphery of ring 10, such ring preferably being circumferentially split at 22. Ring 10 is made of a ferrous metal such as ductile iron or other alloy compatible with the deposition of chromium plate thereon.

Figure 2:
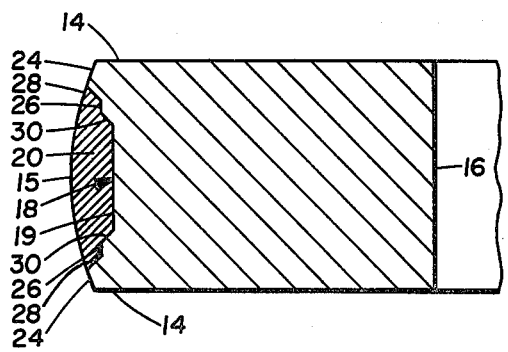
FIG. 2 is an enlarged cross section of the ring of FIG. 1 showing a stepped groove in the outer face of the ring filled with chromium.

More specifically, as shown in FIG. 2, ring 10 has an outer bearing face 12, an inner bore 16, side faces 14, and a groove 18 in the outer bearing face 12. The annular groove 18 in the outer periphery 12 of ring 10 forms axially-spaced outer bearing shoulders 24 between groove 18 and the side faces 14 of the ring. The groove 18 includes a bottom land 19 and a pair of axially-spaced, radially intermediate lands 26 connected to the bottom land 19 and to the outer bearing shoulders 24 by radially outwardly diverging side walls 28 and 30, thereby forming stepped sides for the groove 18. The groove 18 is filled with a layer of electro-deposited chromium 20 extending between the outer bearing shoulders 24. The chromium deposit 20 and outer bearing shoulder 24 form a continuous axially convex surface 15, as shown in FIG. 2.

Preferably, the width of the chromium extending between shoulders 24 is about 75% of the width of surface 12 with the chromium being substantially centered between the side faces 14 of ring 10. In its finished condition, as shown in FIG. 2, the depth of the chromium from the crown 15 to the bottom land 19 is about 0.0065 inches. The diverging side walls 28 and 30 extend at an angle of about 55° with the side walls 14 as shown. The intermediate lands 26 are located about midway between bottom land 19 and outer bearing face 12, the lands 26 being about 0.003 inches from the face 12; the width of lands 26 (parallel to surface 12) is about 0.005 inches.

The foregoing dimensions were developed to achieve the best profile of the chromium 20 on the ring 10 prior to grinding. However, such dimensions may vary within reasonable limits. For example, the width of the chromium may be as much as 90% of the width of the ring; beyond this, the bearing shoulders 24 may not be strong enough to protect the chromium. The depth of the chromium may be as little as 0.003 inches but at a lesser thickness will have insufficient strength. At a depth of more than about 0.009 inches, the fatigue strength of the ring begins to lessen. The 55° angle of divergence from the side walls was chosen to provide the best profile for chrome plating as will be explained. At less than 55°, deeper depressions appear in the plated ring before grinding which requires a greater build-up of chromium; thus, the minimum angle should be no less than 30°. On the other hand, at greater than 55°, the chromium tapers so gradually to a knife edge where it meets bearing shoulders 24 that flaking may occur; thus, the angle of divergence should not exceed about 70°. Similarly, the distance of intermediate lands 26 from surface 12 should not be less than about 0.002 inches to avoid forming too thin a section of chromium between the lands and the finally finished outer surface 12 to avoid flaking. At a distance of more than about 70% of the total groove depth, deeper depressions are formed in the chromium which necessitates a greater chromium build-up before grinding which is to be avoided. Again, to achieve the best chromium profile for grinding, the axial width of the intermediate lands 26 should not exceed about 0.010 inch or be less than about 0.003 inch; otherwise, the effect of the profile is lost.

Figure 3:
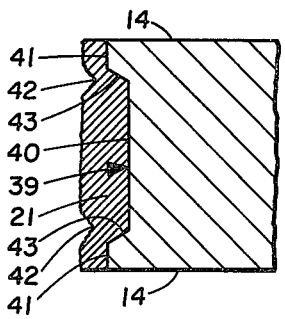
FIG. 3 is a view similar to FIG. 2 showing the build-up of chromium in a non-stepped groove in a piston ring.

FIG. 3 shows a portion of a ring similar to ring 10 with a nonstepped groove 39 of the type illustrated in application Ser. No. 480,164. Groove 39 includes a bottom land 40 connected to axially-spaced outer bearing shoulders 41 by radially diverging side walls 43. FIG. 3 shows the problem experienced in the production of rings with a non-stepped groove. More specifically, it has been found that the chromium builds up in an uneven layer with annular depressions 42 radially opposite the intersection of the side walls 43 with the bottom land 40. The depressions 42 are relatively deep, as shown in FIG. 3, so that it is necessary to chromium plate the surfaces of the groove 39 and the outer bearing shoulders 41 to a thickness sufficient to bring the bottom of depression 42 properly above the plane of the outer bearing shoulders 41 to provide enough chromium to form the continuous convex across the outer periphery of the ring.

Figure 4:
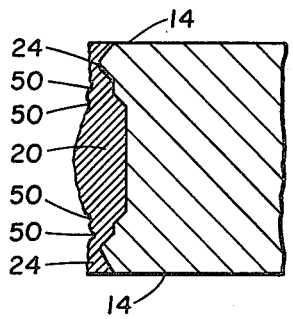
FIG. 4 is a view similar to FIG. 2 showing the build-up of chromium in a stepped groove in a piston ring of the present invention.

In accordance with this invention, it has been found that by forming the groove 18, as shown in FIGS. 2 and 4, the depressions 50 in the chromium 20, in FIG. 4, that occur radially opposite to the intersections of the side walls 28 and 30 with the bottom land 19 and with intermediate lands 26 are considerably shallower than the depressions 42 illustrated in FIG. 3. Since there are double the number of intersections between the diverging side walls and the lands in comparison to the groove of FIG. 3, four annular depressions 50 occur in the chromium 20 shown in FIG. 4. However, since the depressions 50 are considerably shallower, it is only necessary to build up the thickness of the chromium 20 above the outer bearing shoulders 24 by a distance of about 0.010 inches to provide the finished ring profile shown in FIG. 2. Thus, it can be seen that a considerable savings is made in the amount of chromium that must be used and it takes considerably less time for deposition of the chromium 20 in the groove 18 and on the bearing shoulders 24.

The piston ring of the present invention provides a ring capable of withstanding the high speed and high powered diesel engines of today. In the foregoing specification, we have set out certain preferred embodiments of our invention; however, it will be understood that this invention may be otherwise embodied within the scope of the following claims.

What is claimed is:

1. A piston ring having a ferrous body and an annular groove in its outer periphery forming axially-spaced outer bearing shoulders between said groove and the side faces of said ring, said groove including a bottom land and at least one pair of axially-spaced, radially intermediate lands connected to said bottom land and to said outer bearing shoulders by radially outwardly diverging side walls of substantially equal length forming stepped sides for said grooves, said intermediate lands being substantially equally spaced between said bottom land and said outer bearing shoulders, said groove being filled with a layer of electro-deposited chromium extending between said outer bearing shoulders, said outer bearing shoulders and said chromium forming a continuous axially convex outer face on said ring.

2. The piston ring of claim 1 wherein the depth of said layer of chromium is at least 0.0040 inches from said outer bearing faces to said bottom land.

3. The piston ring of claim 2 having one pair of intermediate lands substantially midway between said outer bearing faces and said bottom land.

4. The piston ring of claim 3 wherein the width of the outer surface of said chromium is from 50–90% of the width of said ring between the side faces of said ring.

5. The piston ring of claim 4 wherein said side walls of said groove diverge radially outwardly at an angle of from 30°–65° relative to the side faces of said ring.

6. The piston ring of claim 3 wherein the axial width of each said intermediate land is 0.005 inch.

* * * * *